United States Patent [19]
Howlett, Jr. et al.

[11] Patent Number: 5,908,275
[45] Date of Patent: Jun. 1, 1999

[54] BAG-IN-BAG COMBINATION DUNNAGE AIRBAG

[75] Inventors: John Howlett, Jr., Hensley; Walter Gene Berrier; John Leslie Harrington, both of Sheridan, all of Ark.

[73] Assignee: Illinois Tool Works Inc., Glenview, Ill.

[21] Appl. No.: 08/899,582

[22] Filed: Jul. 24, 1997

[51] Int. Cl.$^6$ .................................................. B60P 7/16
[52] U.S. Cl. .......................................... 410/119; 410/125
[58] Field of Search ..................................... 410/117, 118, 410/119, 122, 125, 155; 206/522; 428/35.2; 383/25, 109, 113

[56] References Cited

U.S. PATENT DOCUMENTS

| | | | |
|---|---|---|---|
| 3,199,689 | 8/1965 | Feldkamp | 410/119 |
| 3,556,318 | 1/1971 | Hollis . | |
| 3,868,026 | 2/1975 | Baxter | 410/119 |
| 3,955,690 | 5/1976 | Baxter . | |
| 4,040,526 | 8/1977 | Baxter et al. | 410/119 |
| 4,136,788 | 1/1979 | Robbins . | |
| 4,591,519 | 5/1986 | Liebel . | |
| 5,788,438 | 8/1998 | Goshorn et al. | 410/119 |

FOREIGN PATENT DOCUMENTS

| | | | |
|---|---|---|---|
| 2090577 | 7/1982 | United Kingdom | 383/109 |

*Primary Examiner*—Stephen T. Gordon
*Attorney, Agent, or Firm*—Schwartz & Weinrieb

[57] ABSTRACT

An inflatable dunnage bag comprises a first inflatable inner bag comprising an inflatable bladder surrounded by a pair of paper plies, and a second outer bag comprising two sets of paper plies disposed upon opposite sides of the first inner bag. The two sets of paper plies comprising the second outer bag are longitudinally offset with respect to each other so as to form flap members on first ends of each set of paper plies which overhang respective second ends of the opposite set of paper plies. The flap members are respectively folded over the second ends of the opposite set of paper plies as single entities and secured thereto by predetermined hot melt adhesive and cold glue bead patterns. The dunnage bag is thus particularly adaptable to being fabricated by automated equipment.

20 Claims, 7 Drawing Sheets

BAG-IN-BAG COMBINATION DUNNAGE AIRBAG

CROSS-REFERENCE TO RELATED PATENT APPLICATIONS

This patent application is related to U.S. patent application Ser. No. 08/654,307, filed on May 28, 1996, and entitled INFLATABLE COMBINATION CARGO PACKING BAG, now U.S. Pat. No. 5,788,438, issued Aug. 4, 1998.

FIELD OF THE INVENTION

The present invention relates generally to dunnage bags for use in connection with the shipment of freight or cargo by means of truck, rail, aircraft, ship, and the like, and more particularly to an improved combination dunnage bag which comprises an inflatable inner bag and a multiple-layered outer paper bag which exhibits improved burst strength characteristics and which is also able to be manufactured or assembled by means of automatic machinery.

BACKGROUND OF THE INVENTION

Inflatable, disposable dunnage bags comprise a relatively inexpensive and easily useable means of stabilizing cargo or freight disposed within cargo holds, containers, boxcars, or trailers of aircraft, trucks, trains, ships, and the like, so as to effectively prevent damage to such goods which would be likely to occur if the goods were not otherwise secured or tied down within the cargo hold or the like since the goods would be subjected to shifting movements within the cargo hold in response to movements of the particular transportation vehicle during shipping or transport. As is well known and conventionally practiced, inflatable dunnage bags are placed between individual, adjacent cargo items or pieces, or between the individual cargo pieces and the side walls of the vehicle which define the cargo hold, in an initially deflated condition and are then subsequently inflated with, for example, compressed air to a predetermined pressure value which is of course below the bursting pressure limit of the bag. Most bags which are conventionally used are specifically constructed so as to withstand bursting pressure values which are within the range of 12–30 psig.

Such conventional inflatable dunnage bags typically comprise a sealed inner plastic bladder or bag, which is fabricated, for example, from polyethylene, and an outer multi-walled or multi-layered paper bag that serves to protect the inner inflatable bag or bladder as well as to increase the bursting strength thereof. A valve is provided upon the inflatable bladder and extends through the outermost paper layer of the multi-layered paper bag so that the dunnage bag can be inflated and expanded when desired, that is, for example, for cargo securing purposes, with compressed air from an external compressed air source.

Manufacture of such conventional inflatable dunnage bags typically comprises folding a predetermined length of multi-layered kraft paper onto itself and about a longitudinal axis thereof such that the edges thereof can form an overlapping longitudinal seam which extends along the centerline of the bag, the result being a multi-walled paper tube having opposite open ends. The sealed plastic bladder is then inserted into the paper tube, and the tube ends are then folded over onto themselves so as to be subsequently glued or sewn closed thereby forming the completed dunnage bag.

It is thus appreciated that the fabrication of conventional dunnage bags as set forth hereinbefore presents several manufacturing problems. There is initially the problem of being capable of cutting a large number of paper plies during a single cutting operation. In addition, the manufacture of the bag is dependent upon or limited by the ability to stitch together the multiple layers of paper comprising the outer paper bag, as well as the capability of effectively folding and gluing the folded ends of the bag to the body portion of the bag such that the folded glued bonds do not subsequently fail or come undone. The construction of such multi-layered bags is also relatively labor intensive such that the greater the number of paper plies or layers, the greater the labor costs involved in fabricating the particular bag. Consequently, while it is desirable to attain an inflatable dunnage bag which exhibits a higher capacity to resist loading, or in other words, exhibits greater bursting pressure values as a result of being fabricated as a multi-layered structure, the cost of such a bag is higher than conventional bags with fewer layers of paper.

Consequently, in view of the foregoing, it was the object of the aforenoted related patent application, Ser. No. 08/654,307, filed on May 28, 1996, and entitled INFLATABLE COMBINATION CARGO PACKING BAG, to provide an improved inflatable dunnage bag which in fact exhibited higher bursting strength or pressure values and which was easier to manufacture in view of the fact that it was no longer necessary to sew or stitch together all of the paper plies or layers comprising the multi-layered paper tube of the dunnage bag, and in addition, the number of paper plies or layers which had to be glued together was also reduced. In accordance with that invention, the improved inflatable dunnage bag comprised a "bag within a bag" wherein a first inner bag, comprising an inflatable polyethylene bladder disposed within a two-ply paper bag, is subsequently inserted or encased within a second outer bag which may comprise two, four, or six paper plies. Consequently, while the same number of paper plies, for example, still comprise the completed dunnage bag, only those paper plies comprising the first inner bag need to be stitched or sewn, and the number of paper plies which need to be folded and glued in order to complete the manufacture of the dunnage bag, that is, those plies comprising the second outer bag, has been effectively reduced.

More particularly, with reference being made to FIG. 1 of the drawings, the inner or first inflatable bag is illustrated and generally indicated by the reference character 30. The bag 30 comprises a first end 32 and a second opposite end 34, and as can be appreciated from FIG. 2, with only first end 32 being shown, each end 32 and 34 is enclosed by means of a binding material 15 prior to the ends 32 and 34, and the binding material 15, being sewn together so as to close and seal the ends 32 and 34 of the bag 30. The longitudinal or lengthwise seam 36 of the bag 30 is formed by overlapping the longitudinal edge portions 37 and 39 of the bag 30, and once the seam 36 is formed and the ends 32 and 34 are closed and sealed, the inner bag 30 defines a closed and sealed interior which is able to be inflated by means of a suitable compressed gas, such as, for example, air.

As shown in FIG. 2, the inner or first inflatable bag 30 further comprises a thermoplastic bladder 10 which is fabricated as a continuous polyethylene tube that only requires heat sealing of its two opposite ends. The bladder 10 is initially disposed in a flattened state and is seen to comprise a first upper wall 10A and a second lower wall 10B which are sealed together at the opposite ends so as to form a sealed joint 12. The joint 12 is formed somewhat inwardly from the edge portion of the bladder 10 so as to form or define an end flap portion 13A. Paper plies 1 and 2 envelop the bladder 10, and in accordance with a first mode of constructing the composite bag 30, the first paper ply 1 is disposed atop the second paper ply 2, and the paper plies 1 and 2 are then folded in half so that each paper ply 1 and 2 has a first end 1C,2C and a second end 1D,2D in registry with each other, wherein the bladder 10 is disposed interiorly of, and enveloped by, the paper plies 1 and 2. In order to seal each end 32 and 34 of the composite inner bag 30, a binding 15 is disposed about the end 32, as illustrated, of the bag 30 so as to cover the paper plies 1 and 2, and the flap portion 13A of the bladder 10, and subsequently, suitable stitching 17 penetrates the composite end 32 of the bag 30 as defined by paper plies 1 and 2, bladder flap portion 13A, and binding 15. A similar technique is of course implemented with respect to inner bag end 34. In lieu of folding paper plies 1 and 2 in half, separate upper and lower paper plies 1 and 2 may be simply disposed atop each other such that the four separate and discrete paper plies 1 and 2 are simply secured and sealed together without any folding of the the paper plies being required.

In order to inflate the interior portion of the composite inner bag 30 with a suitable compressed gas, such as, for example, air, an inflation valve 20 is heat sealed within the upper wall 10A of the bladder 10 and projects outwardly through respective holes 25a, 25b, and 25c that are respectively provided within upper walls 2A, 1A, and 10A of the paper plies 2 and 1, and the bladder 10. While the composite inner bag 30 exhibits an average burst strength of approximately 8.0 psig, which is certainly adequate for light-duty or light-cargo applications, the composite inner bag 30 is adapted or intended to be disposed within a second outer bag comprising a tube fabricated from additional paper plies, for example, two, four, or six additional plies, whereupon insertion of the first inner bag 30 within the second outer paper bag, the ends of the second outer paper bag are then closed and sealed. Such an arrangement, comprising in effect a "bag within a bag", exhibits higher bursting strength or pressure values.

With reference therefore being made to FIG. 4, one end of the composite "bag within a bag" is disclosed, and it is to be understood that the other end of such composite bag comprises substantially identical structure. More particularly, it is seen that the first inner composite bag 30 of FIG. 2 has been inserted between two additional paper plies 3 and 4 whereby the completed or assembled composite bag 40 comprises a total of four paper plies, two of which initially comprise the first inner composite bag 30 and the other two comprising the outer composite bag 35. The paper plies 3 and 4 have respective first and second ends 3A,4A, and 3B,4B, with the second end 3B being folded and secured to the first end 3A by means of a glue bead 80, while the second end 4B is similarly folded and secured to the second end 3B by means of a glue bead 82. In order to complete the assembly of the composite bag 40, the outer surface 4C of paper ply 4 is coated with a suitable heat-sealable plastic, such as, for example, polyethylene, whereby through means of known heat-sealing techniques, second end 4B can be heat-sealed to first end 4A.

With comparison being made between the completed or assembled composite bag 40, comprising the first inner composite bag 30 and the second outer composite bag 35, and a conventional or prior art four-ply bag as shown in FIG. 3, it is readily appreciated that although the same number of glue beads are required for fabrication of the completed or assembled composite bag, the four-ply composite bag 40 shown in FIG. 4 is easier to fabricate than the conventional or prior art bag shown in FIG. 3 due to the reduced number of paper plies that are required to be simultaneously cut, folded, and glued together since the first inner composite bag 30 of the completed or assembled bag 40 of FIG. 4 is separately fabricated. In addition, having a reduced number of simultaneously folded plies reduces the tendency of the folded ends of the completed or assembled bag to unfold or fail. Still further, the bursting strength of the completed or assembled composite bag 40 is greater than that of the conventional or prior art bag shown in FIG. 3. It is lastly noted that while the first inner composite bag 30 is disposed interiorly or within the second outer composite bag 35, and wherein the inflation valve 20 of bag 30, as disclosed in FIG. 2, is not actually shown or illustrated in the completed or assembled composite bag 40 of FIG. 4, it is to be understood that the valve 20 does project outwardly through suitable holes, not shown, provided within paper plies 3 and 4 so as to be externally accessible in order to inflate the bladder of inner composite bag 30 with compressed gas from a suitable source of compressed gas, also not shown.

With reference now being made to FIG. 5, a further embodiment of the invention is disclosed within the aforenoted related patent application and it is seen that in accordance with this embodiment, the completed or assembled composite bag 40 comprises a total of six paper plies wherein two of such paper plies comprise or form a part of the first inner composite bag 30, including the inflatable bladder 10, and the remaining four paper plies comprise the second outer composite bag 35. The four paper plies 3–6 each have respective first and second ends 3A–6A and 3B–6B which are uniquely folded so as to reduce the number of folded ply ends and the number of glue beads needed to secure the ply ends, as compared to, for example, a conventional six-ply bag as shown in FIG. 7. More particularly, it is seen that in accordance with the invention embodiment of FIG. 5, the ends 6A and 6B are heat-sealed together, while ends 5B, 4B, and 5A are glued together by glue beads 50. End 3B is folded so as to be interposed between first inner composite bag 30 and end 3A, while end 4A is freely interposed between ends 3A and 5A. Comparing this structure to that of FIG. 7, it is seen that all six paper plies 1–6 are all simultaneously folded back upon themselves as a collective group before the various ends are glued and heat-sealed together. As noted hereinbefore, the greater the number of paper plies to be folded, the more burdensome it becomes to in fact achieve such folding of the paper ply ends, to bind such folded plies with the glue, and to maintain the folded and glued plies in such folded and glued state due to the inherent tendency of the folded ends to unfold and separate from each other.

An eight-ply composite bag 40, constructed in a similar manner in accordance with the principles of the invention of the previously noted related patent application, is illustrated in FIG. 6 and is again seen to comprise the first inner composite bag 30, which includes the first two paper plies and the inflatable bladder, while the second outer composite bag 35 comprises paper plies 3–8. The paper plies 3–8 have respective first and second ends 3A–8A and 3B–8B which are also uniquely folded, glued, and heat-sealed so as to effectively reduce the number of plies needed to be glued and heat-sealed as compared to a conventional eight-ply dunnage bag as illustrated in FIG. 8. In order to glue and seal the conventional bag of FIG. 8, seven glue beads and one heat-seal are required, whereas in connection with the inventive bag of FIG. 6, only three glue beads and one heat-seal are required. More particularly, ends 7A and 7B are glued together by glue bead 60, while end 5B is glued to end 4B. and end 4B is glue to end 5A by glue beads 70. Ends 8A and 8B are heat-sealed together, while ends 6A and 6B are freely interposed between ends 7A and 5B, and ends 4A, 3B, and 3A are freely interposed between end 5A and first inner composite bag 30.

While it is therefore appreciated that the composite "bag within a bag" 40 of the aforenoted, previously filed patent application has certainly resolved some of the manufacturing problems or deficiencies characteristic of conventional dunnage bags, and has concomitantly achieved its initial objectives of enhancing the bursting strength or burst pressure values of the bag while maintaining the same number of paper plies comprising the bag, and yet simplifying the manufacture of the bag while enhancing the reliability or structural integrity of the bag by reducing the number of paper ply folds which need to be simultaneously handled, folded, glued, and heat-sealed, it has been realized that other manufacturing or fabrication deficiencies, problems, and drawbacks nevertheless exist and need to be addressed. For example, in order to simply fold and seal the various embodiments of the completed or assembled composite dunnage bags 40 as disclosed within the variously illustrated embodiments of FIGS. 4–6, particular end portions of specific paper plies need to be interposed or interleaved between other end portions of other specific paper plies. Such interleaving or interdigitating of the paper plies can only be accomplished manually and is not susceptible to being accomplished in a mass production manner by means of automated machinery. Such processing is also extremely tedious, slow, time-consuming, and not particularly cost-effective from a manufacturing or production point of view. A need therefore exists in the art for multi-ply or multi-layered dunnage bags which can be simply manufactured, which exhibit enhanced bursting strength or pressure values as well as enhanced reliability and structural integrity, and which can be manufactured by automated equipment.

OBJECTS OF THE INVENTION

Accordingly, it is an object of the present invention to provide a new and improved multi-ply or multi-layered inflatable composite dunnage bag.

Another object of the present invention is to provide a new and improved multi-ply or multi-layered inflatable composite dunnage bag which overcomes the various drawbacks or disadvantages characteristic of conventional prior art dunnage bags, as well as those manufacturing drawbacks characteristic of the dunnage bag fabricated in accordance with the teachings and principles of the aforenoted related patent application.

A further object of the present invention is to provide a new and improved multi-ply or multi-layered inflatable composite dunnage bag which exhibits improved or enhanced bursting strength or bursting pressure values, which is relatively simple to construct or fabricate so as to be cost-effective, which exhibits structural integrity and reliability, and which is capable of being manufactured or fabricated by means of automated equipment or machinery.

SUMMARY OF THE INVENTION

The foregoing and other objectives are achieved in accordance with the teachings and principles of the present invention through the provision of an inflatable dunnage bag which comprises a first inner composite bag comprising an inflatable bladder enveloped or encased within a pair of paper plies, and a second outer composite bag comprising, for example, two sets of six additional paper plies, with one set of such six additional paper plies disposed upon each one of the opposite sides of the first inner composite bag. The innermost paper ply of each set of paper plies, and the next adjacent outer paper ply of the same set of paper plies, are bonded to each other, and similarly the outermost paper ply of the same set of paper plies, and the next adjacent inner paper ply of the same set of paper plies, are bonded to each other such that each set of paper plies forms, in effect, a paper ply unit that can be readily manipulated together so as to close an end portion of the dunnage bag, and that exhibits stress-absorption values which ensure structural integrity and burst-strength resistance without the need for bonding together the two central paper plies or for bonding such central plies to their adjacent plies.

In addition, the endmost portions of each paper ply unit formed from each set of paper plies are longitudinally offset with respect to each other such that these endmost portions of the paper ply units define longitudinally extending, overhanging flap members with respect to each other and with respect to the first inner composite bag. Since these overhanging flap members also, in effect, define unitary flap members in view of the fact that such flap members are simply longitudinal extensions of their respective paper ply units, each overhanging flap member can be simply folded upwardly or downwardly, as the case may be, as a single entity such that the longitudinally remote or distal edge portion of each flap member can be easily and readily secured to the opposite or non-flap end of the other set of paper plies. In this manner, no interleaving or interdigitating of the various paper plies comprising the second outer composite bag is required or necessitated, and in addition, such folding of the flap members and the securing thereof to the opposite end of the other set of paper plies may be readily and easily achieved or accomplished by means of automated machinery or equipment.

BRIEF DESCRIPTION OF THE DRAWINGS

Various other objects, features, and attendant advantages of the present invention will be more fully appreciated from the following detailed description, when considered in connection with the accompanying drawings in which like reference characters designate like or corresponding parts throughout the several views, and wherein.

DETAILED DESCRIPTION OF THE PREFERRED EMBODIMENT

Figure 11:
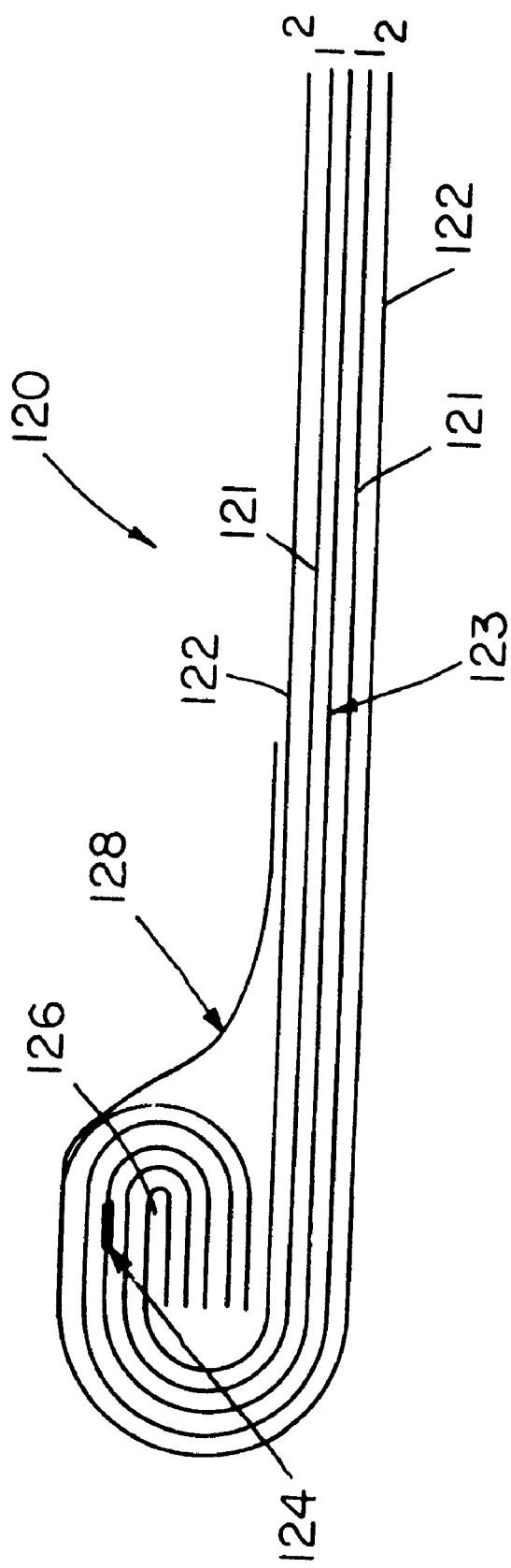
FIG. 11 is a partial, schematic, enlarged, cross-sectional view of the first inner composite bag for disposition within the second outer composite bag, as shown in FIG. 10, so as to cooperate therewith in comprising the new and improved inflatable dunnage bag of the present invention.
Figure 13:
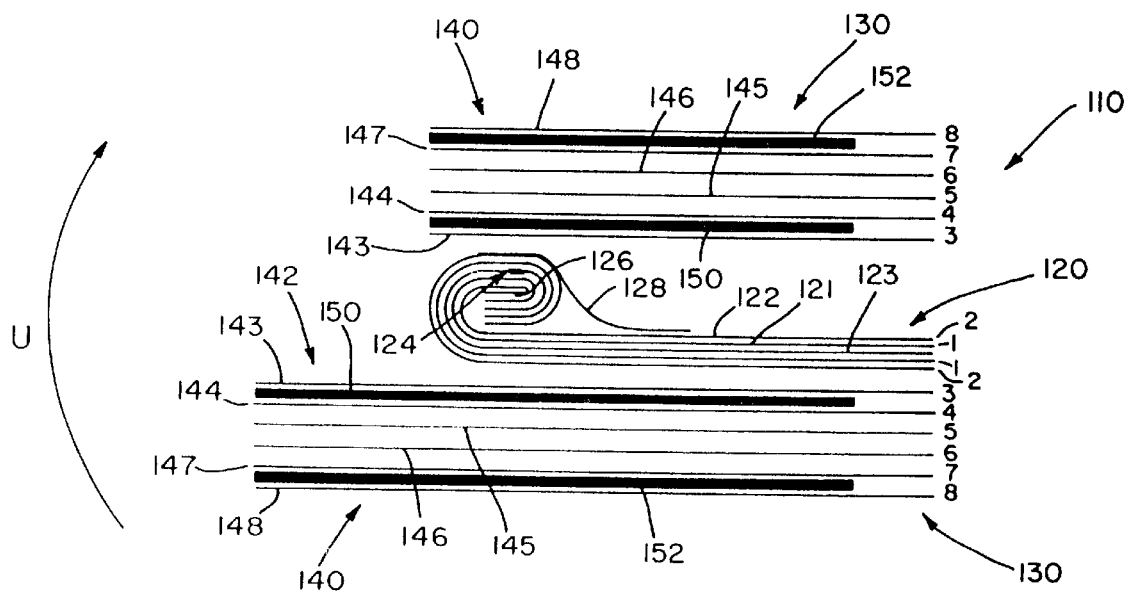
FIG. 13 is an enlarged, exploded view of the left end portion of FIG. 10 showing the first inner composite bag and the two sets of paper plies forming the second outer composite bag prior to the folding and sealing of the end flap members.
Figure 14:
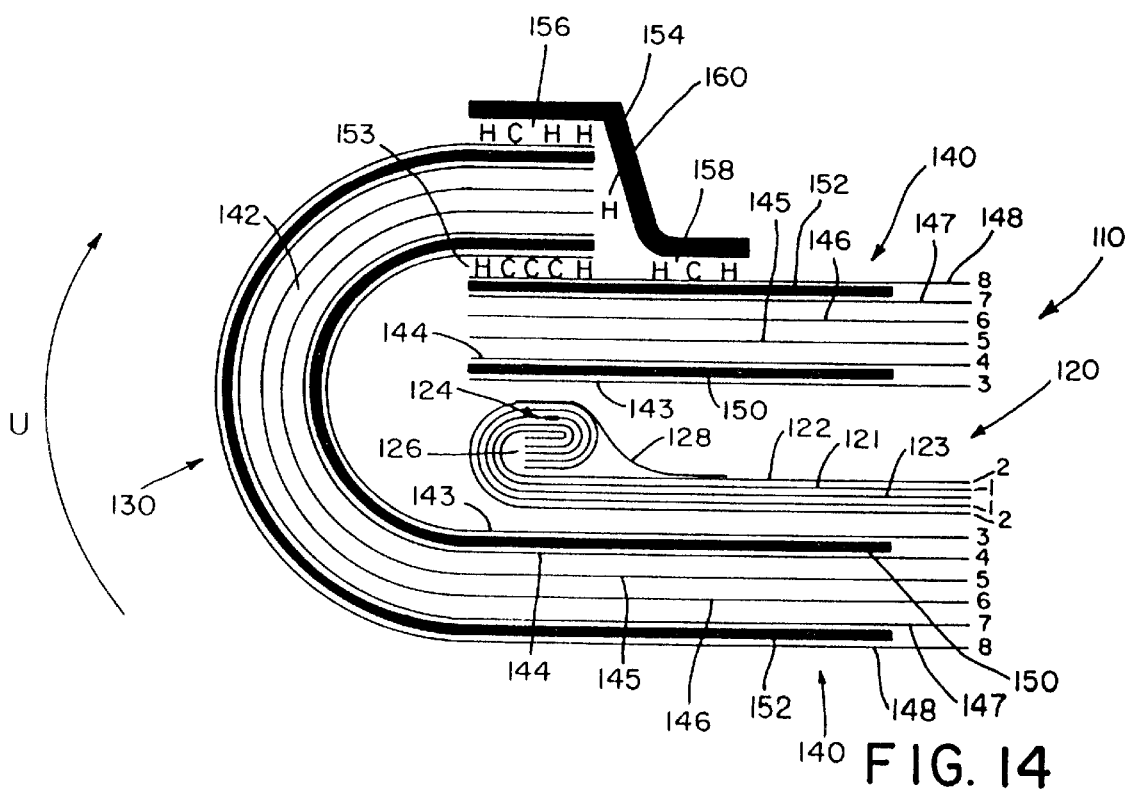
FIG. 14 is a view similar to that of FIG. 13 comprising, however, an enlarged, exploded view of the left end portion of FIG. 12 wherein the end flap members are disposed in their folded and sealed states.

Referring again to the drawings, and more particularly to FIGS. 9–11 and 13 thereof, the new and improved inflatable dunnage bag, constructed in accordance with the principles and teachings of the present invention is illustrated and generally indicated by the reference character 110. The dunnage bag 110 is broadly similar to the inflatable dunnage bag 40 of FIGS. 4–6 in that the same comprises a first inner composite bag 120, as best seen in FIG. 11, and a second outer composite bag 130 within which the first inner composite bag 120 is encased or enveloped, however, as will be discussed more fully hereinafter, the closure and sealing structure of the dunnage bag 110 is entirely different from that of the dunnage bag 40 of FIGS. 4–6.

As shown in FIG. 11, the first inner composite bag 120 is seen to comprise an inflatable bladder 123 which is similar to the bladder 10 of the inner bag 30 and may therefore be fabricated from a similar suitable thermoplastic material, such as, for example, polyethylene. As was the case with the bladder 10 of inner bag 30, bladder 123 comprises a flattened tubular member wherein each end thereof is heat sealed so as to close the bladder member and render the same airtight and capable of being inflated. The heat sealed end of the one end portion of the bladder 123 illustrated in FIG. 11 is denoted by reference character 124. The inflation valve member operatively associated with the inflatable bladder 123, and by means of which the same is inflated with a suitable compressed gas, such as, for example, air, has been omitted from the drawings simply for clarity purposes. First and second paper plies 121 and 122 are disposed upon both opposite surfaces or sides of the bladder 123, and each longitudinal end portion of the first inner composite bag 120, comprising the inflatable bladder 123 and the two sets of inner and outer paper plies 121,122 and 121,122 is folded over upon itself so as to form a double fold end closure 126. The closure 126 is then secured in its folded state by means of, for example, a suitable adhesive or bonding tape 128. It is to be noted that while a double fold end closure is shown in this embodiment of the first inner composite bag 120, the end closure may alternatively comprise a single fold end closure.

With reference again being made to FIGS. 9, 10, and 13, the structure of the second outer composite bag 130, and the relative disposition of its component parts with respect to the first inner composite bag 120, will become apparent. More particularly, the second outer composite bag 130 is formed from two sets of paper plies 140,140 disposed upon opposite sides of the first inner composite bag 120 such that the first inner composite bag 120 is interposed between the two sets 140,140 of paper plies. As best appreciated from FIGS. 10 and 13, the sets 140,140 of paper plies are longitudinally offset with respect to each other, as well as with respect to the first inner composite bag 120 so as to form longitudinally extending overhanging flap members 142, the purpose or use of which will be explained more fully hereinafter. Each flap member 142 extends longitudinally beyond its associated side or surface of the first inner composite bag 120 so as to, in effect, have an overhanging longitudinal extent of approximately four inches.

Figure 1:
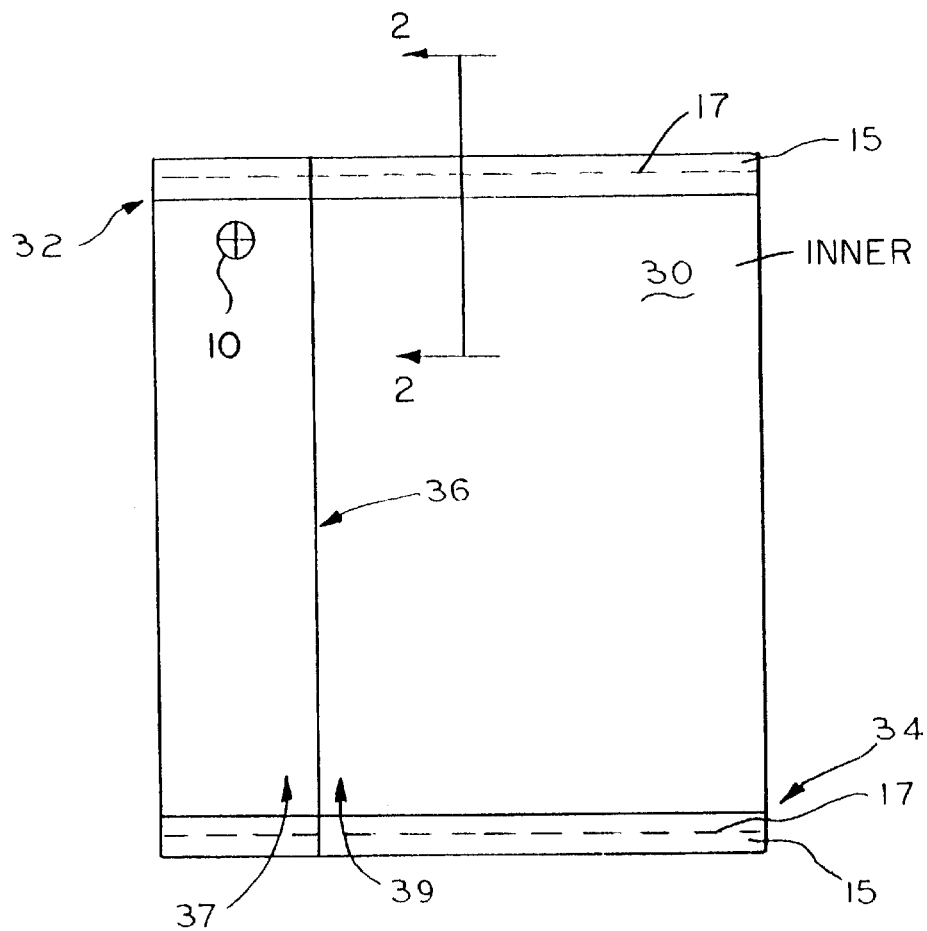
FIG. 1 is a plan view of the first inner composite bag of the invention set forth within the aforenoted related patent application.
Figure 2:
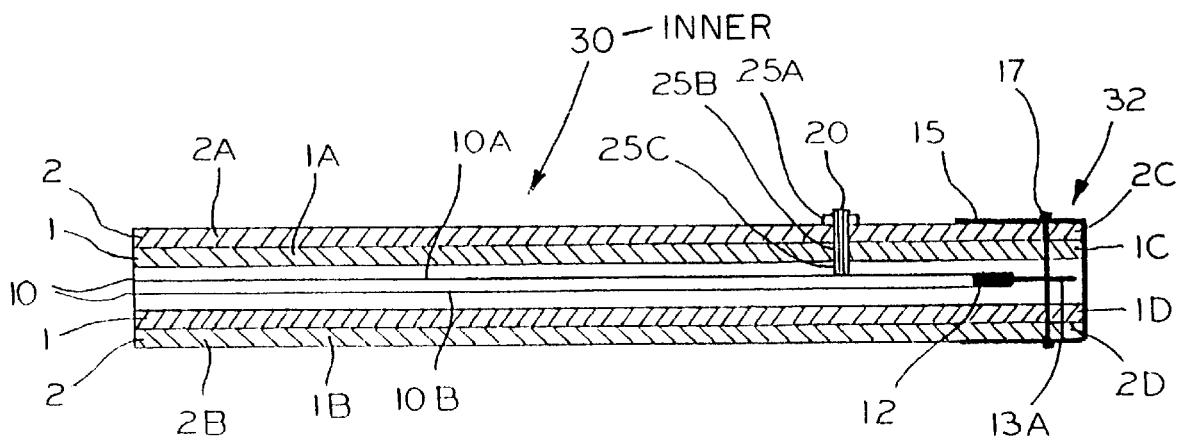
FIG. 2 is a cross-sectional view of the first inner composite bag shown in FIG. 1 as taken along the lines 2—2 of FIG. 1.
Figure 3:
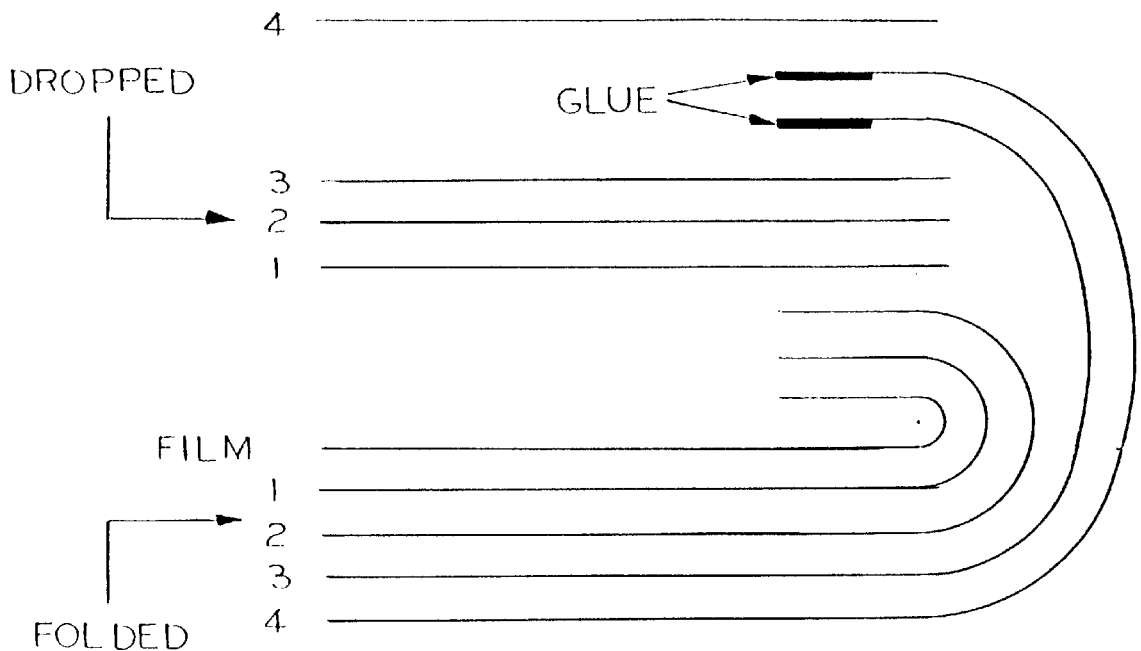
FIG. 3 is a schematic, partial cross-sectional view of a four-ply PRIOR ART dunnage bag.
Figure 4:
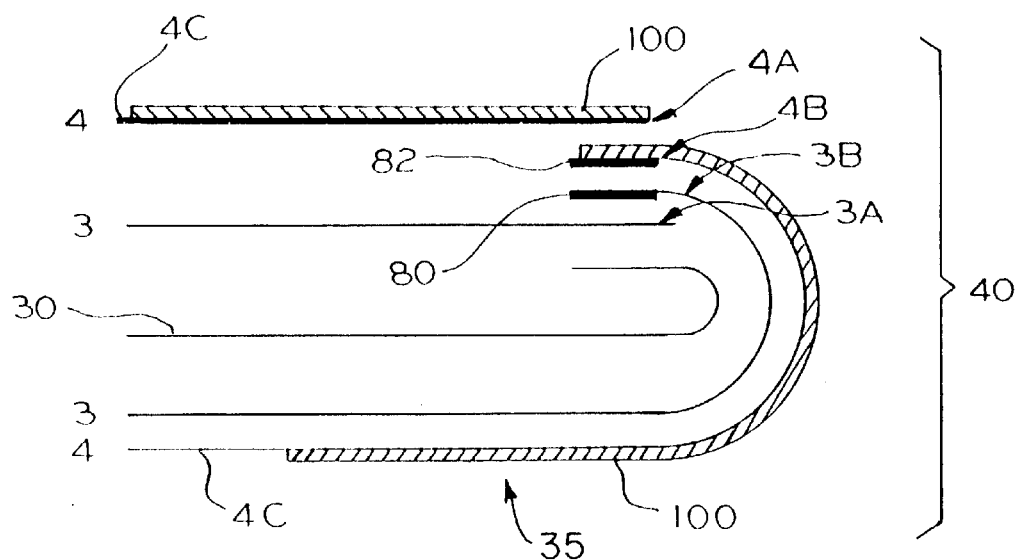
FIG. 4 is a view similar to that of FIG. 3 showing, however, a four-ply composite dunnage bag having the first inner composite bag of FIG. 1 incorporated therein.
Figure 5:
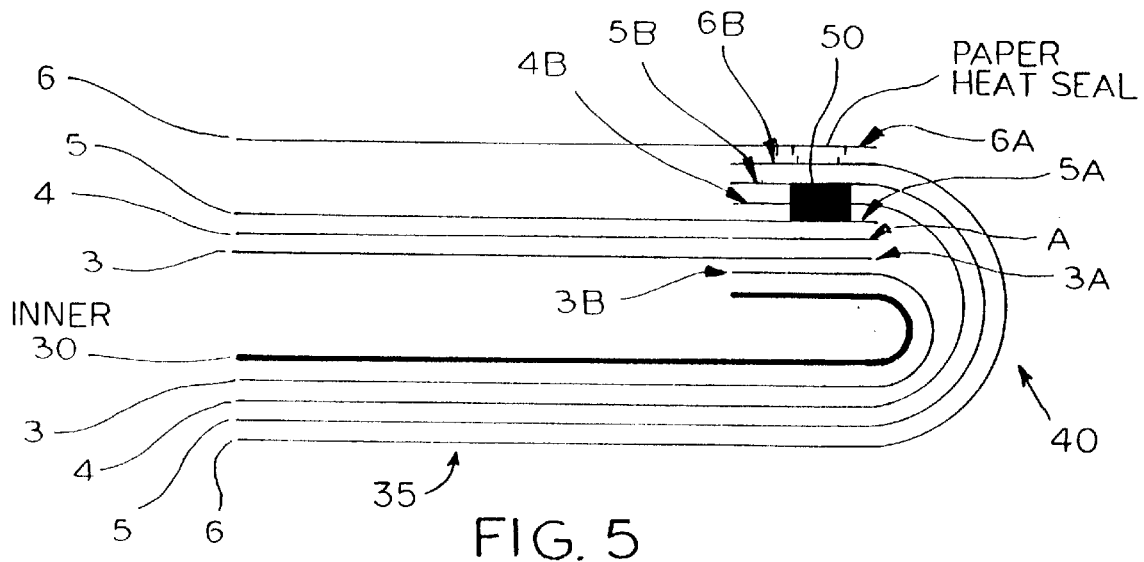
FIG. 5 is a view similar to that of FIG. 4 showing, however, a six-ply composite dunnage bag having the first inner composite bag of FIG. 1 incorporated therein.
Figure 6:
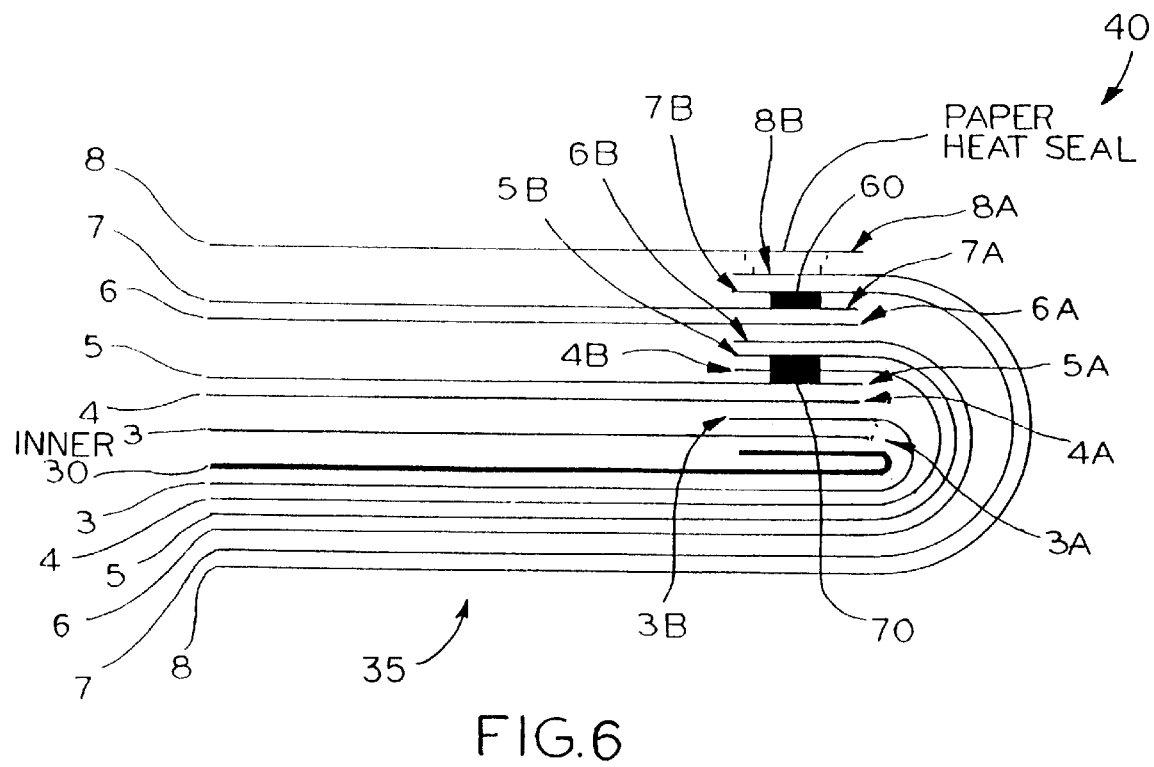
FIG. 6 is a view similar to that of FIGS. 4 and 5 showing, however, an eight-ply composite dunnage bag having the first inner composite bag of FIG. 1 incorporated therein.
Figure 7:
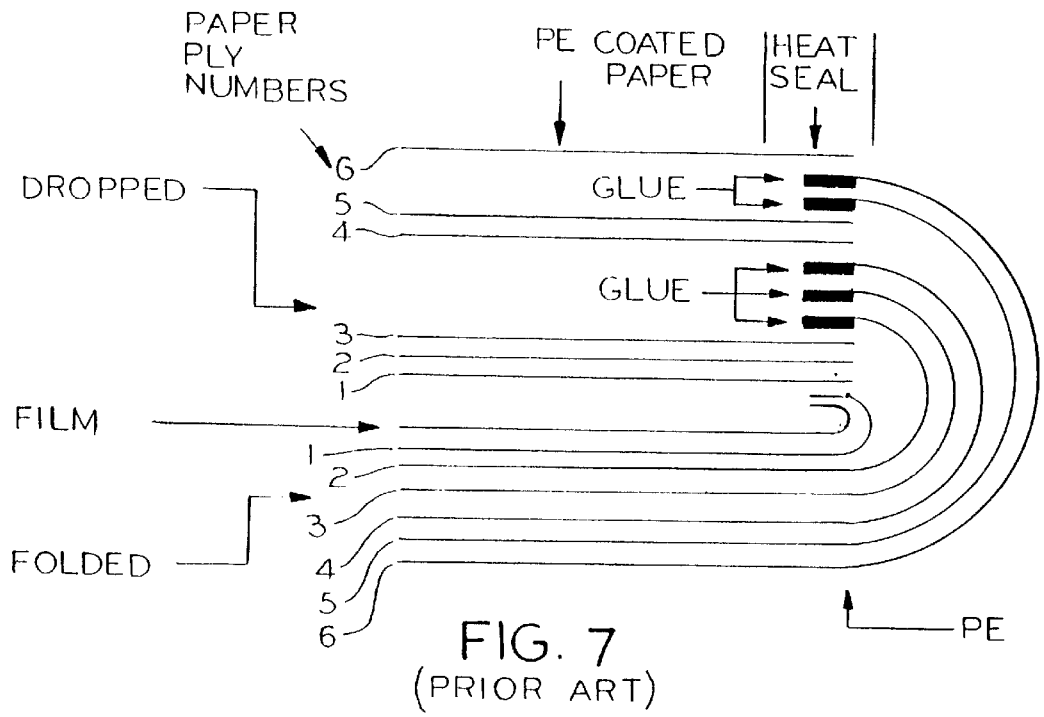
FIG. 7 is a view similar to that of FIG. 3 showing, however, a six-ply PRIOR ART dunnage bag.
Figure 8:
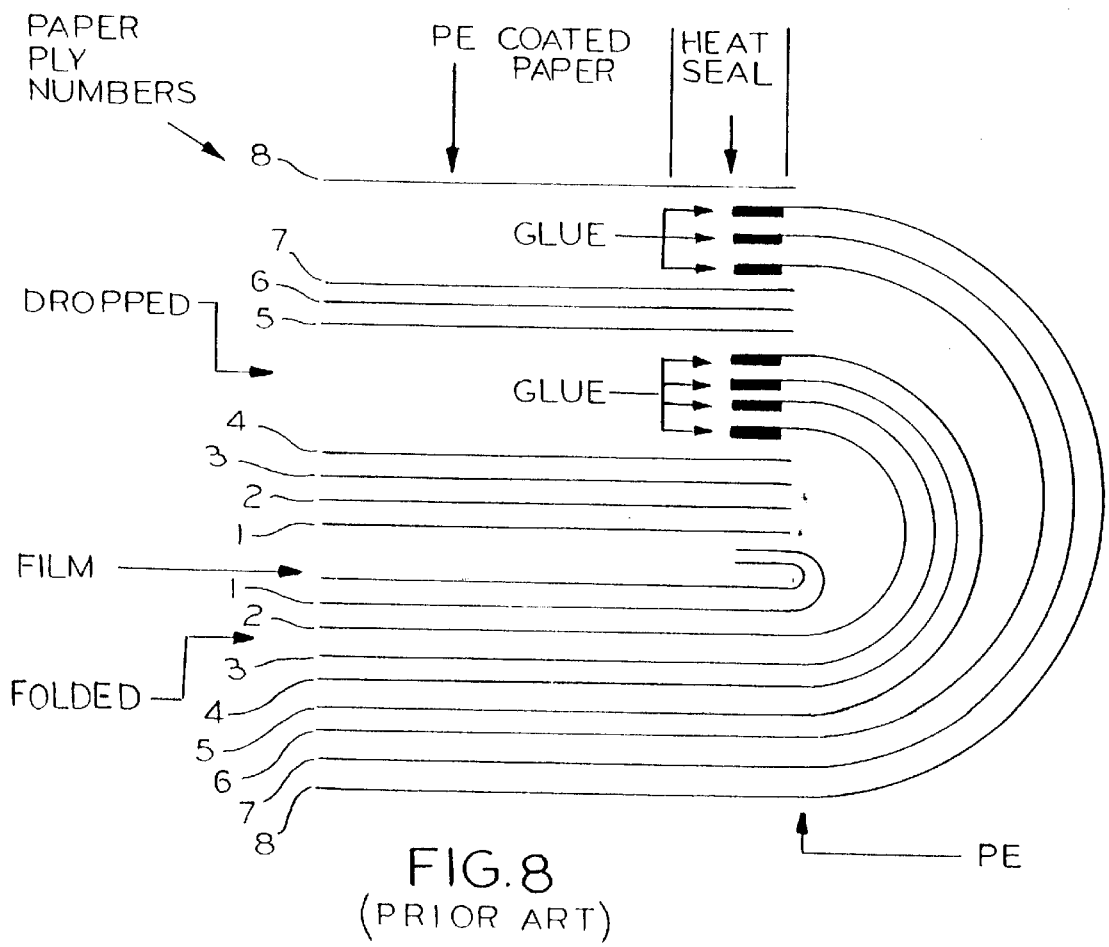
FIG. 8 is a view similar to that of FIGS. 3 and 7 showing, however, an eight-ply PRIOR ART dunnage bag.
Figure 9:
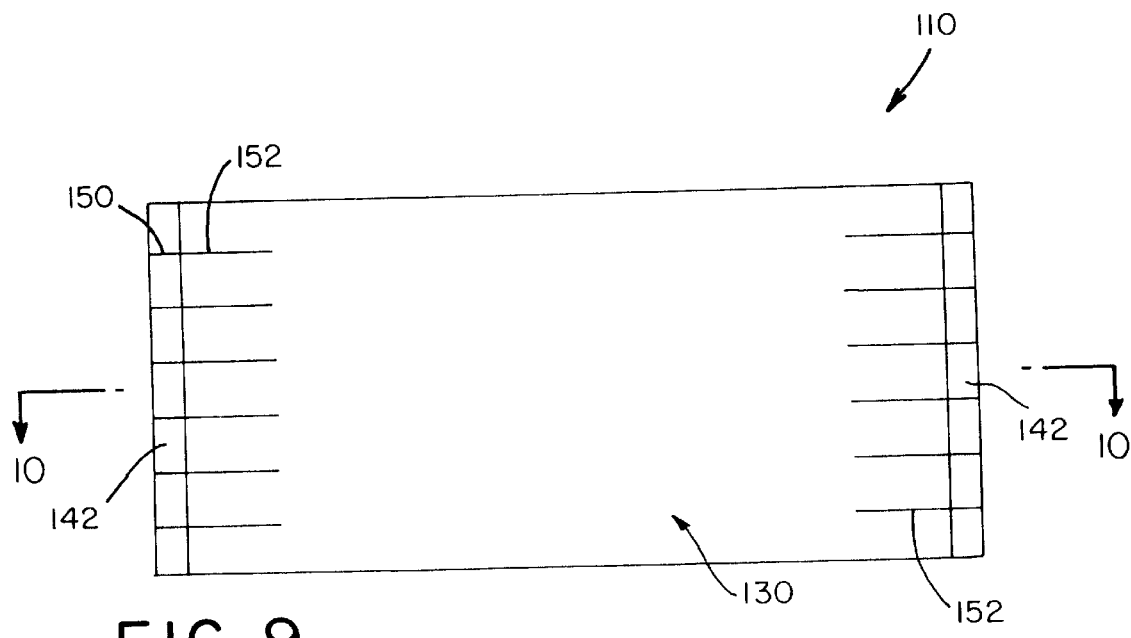
FIG. 9 is a view similar to that of FIG. 1 showing, however, the new and improved inflatable dunnage bag of the present invention prior to the complete closure and sealing of the opposite end flap members.
Figure 10:
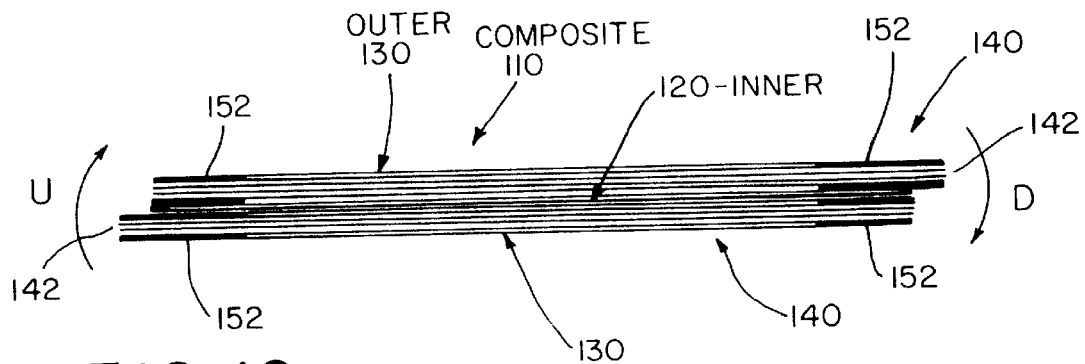
FIG. 10 is a cross-sectional view of the new and improved inflatable dunnage bag shown in FIG. 9 as taken along the line 10—10 of FIG. 9 and showing the first inner composite bag and the second outer composite bag, which together define the complete new and improved inflatable dunnage bag of the present invention, and wherein the end flap members have not as yet been folded and sealed.
Figure 12:
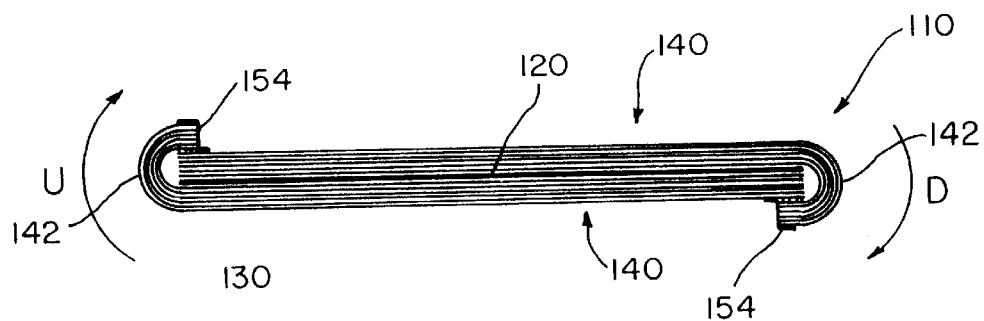
FIG. 12 is a view similar to that of FIG. 10 showing, however, the flap members in their folded and sealed states.

Each set 140 of paper plies is seen to comprise, for example, six paper plies 143–148, however, as was the case of the various embodiments disclosed, for example, in FIGS. 4 and 5, the specific number of paper plies may be otherwise selected as desired. In order to form each set 140 of paper plies into, in effect, a paper ply unit such that handling of such paper ply units is simplified so as to, in turn, subsequently facilitate the manufacture or fabrication of the completed or assembled dunnage bag 110, the paper plies 143–148 of each set 140 of paper plies are bonded together in accordance with a bonding arrangement or technique which is unique to the present invention. More particularly, with particular reference being made to FIGS. 9 and 13, the innermost paper ply 143, that is, the paper ply which is disposed adjacent to and in contact with the first inner composite bag 120 of each paper ply set 140, is adhesively bonded by means of, for example, cold glue beads 150 to the next adjacent outer paper ply 144, and in a similar manner, the outermost paper ply 148, that is, the paper ply which is disposed most remote from the first inner composite bag 120 of each paper ply set 140, is adhesively bonded by means of, for example, cold glue beads 152 to the next adjacent inner paper ply 147. It is noted that the longitudinal extent of the cold glue beads 150 and 152 which are disposed upon each end of each set 140 of paper plies which does not constitute or form a flap member 142 is shorter than the longitudinal extent of the cold glue beads 150 and 152 which are disposed upon each end of each set 140 of paper plies which does constitute or form a flap member 142 simply because, as will become apparent shortly, each flap member 142 must have an extended length or overlapping extent so as to in fact be able to be folded over the corresponding or associated end of the other set 140 of paper plies, which does not constitute the flap member 142, so as to be able to be properly and securely bonded thereto. In particular, the shorter longitudinal extents of the cold glue beads 150 and 152 may comprise a length dimension of, for example, six inches, while the longer longitudinal extents of the cold glue beads 150 and 152 may comprise a length dimension of, for example, ten inches. The flap members 142 may therefore have a longitudinal extent comprising a length dimension of approximately four inches, and it is also noted that the cold glue beads 150 and 152 are transversely spaced with respect to each other by means of a distance which may be, for example, four inches.

When it is desired to in fact form the closed and sealed dunnage bag 110 from the component parts thereof comprising the first inner inflatable composite bag 120 and the two sets 140,140 of paper plies comprising, in effect, the second outer composite bag 130, the flap members 142,142 of the two sets 140,140 of paper plies are folded upwardly and downwardly, as the case may be, that is, whether considering the same as being on the left or right side of, for example, FIGS. 10 and 12–14, and as designated respectively by means of the arrows U and D, such that the flap members 142,142 respectively overlap the associated or corresponding end portions of the sets 140,140 of paper plies which do not constitute the flap members 142,142. It is to be noted that while glue beads similar to glue beads 150 and 152 can be provided between paper plies 144–147, it has been found that the provision of such additional glue beads does not contribute in any noticeable or substantial manner to the structural integrity or reliability of the seals of the end flap members 142,142 in that, apparently, the primary stresses developed within the end flap members 142,142, when disposed in their folded states, are borne by the innermost and outermost paper plies. In addition, since such additional glue beads are therefore not required from a structural integrity or reliability point of view, the elimination or absence of such additional glue beads in connection with paper plies 144–147 provides a cost-saving factor in connection with the manufacture of the dunnage bags.

In order to respectively secure the folded flap member 142,142 to the associated non-flap end portions of the other set 140 of paper plies, the flap members 142,142 are respectively bonded to such associated non-flap end portions of the other set 140 of paper plies by means of another bonding arrangement or technique which is unique to the present invention. More particularly, as best seen or appreciated from FIG. 14, the surface portion of paper ply 143 which forms a part of the flap member 142 is bonded to the non-flap end portion of paper ply 148 of the other set 140 of paper plies by means of a predeterminedly arranged series of hot melt adhesive beads H and cold glue beads C, as denoted by the reference character 153, which are disposed or extend transversely with respect to or across the longitudinal extent of the dunnage bag 110 so as to be disposed perpendicular to the longitudinal extents of cold glue beads 150. The use of a combination of the hot melt adhesive beads H and cold glue beads C is desirable such that the structural integrity of the dunnage bags 110 is ensured despite, for example, varying temperature conditions, under which the dunnage bags 110 may be employed. Suitable hot melt adhesive may comprise, for example, HB FULLER 7268, while suitable cold glue may comprise, for example, BIRDSONG EXP-93. The particular pattern of hot melt adhesive beads H and cold glue beads C has been developed in order to optimally utilize the bonding characteristics of hot melt adhesives and cold glues. For example, it is noted that in accordance with the unique arrangement or pattern of hot melt adhesive and cold glue beads of the invention, the hot helt adhesive beads H are disposed outwardly of the cold glue beads C in view of the fact that the hot melt adhesive beads H will bond or set more readily than the cold glue beads C. Consequently, the hot melt adhesive beads H hold or retain the flap members 142,142 bonded to the non-flap end portions of the paper ply sets 140,140 while the cold glue beads C are setting. Once set, the cold glue beads C may similarly ensure retention of the flap members 142,142 upon the non-flap end portions of the paper ply sets 140,140 despite temperature conditions which may possibly adversely affect the holding or adhesive retention capabilities of the hot melt adhesive beads H.

In order to further ensure the structural integrity of the dunnage bags 110, and more particularly in connection with the structural integrity of the folded flap portions thereof such that the flap portions do not in fact fail and unfold, suitable tape 154 may be disposed over the closed and sealed flap members 142,142. The tape 154 may be secured to the flap end portion of outer paper ply 148 by means of a suitable combination of hot melt adhesive and cold glue beads H and C, respectively, as disclosed at 156, and similarly to the outer surface portion of outer paper ply 148 of the other set 140 of paper plies, to which the flap member 142 is secured, by means of another pattern of hot melt adhesive and cold glue beads H and C as disclosed at 158. An intermediate portion of the tape 154 may be secured to the end face of the flap member 142 by means of a single bead of hot melt adhesive H as shown at 160. It is noted that while end flap members 142,142 are closed and sealed in accordance with the teachings, principles, and techniques unique to the present invention as has been disclosed, the side edges of the outer composite bag 130 as formed by the sets of paper plies 140,140 are sealed in a conventional manner, not shown. In addition, while the outer composite bag 130, which is disclosed as comprising two end flap members 142,142, may comprise only a single end flap member 142 with the other end being closed in a manner similar to the conventional closing of the side edge portions of the outer composite bag 130, the provision of the two end flap members 142,142 enables the outer composite bags 130 to be fabricated faster and more efficiently by automated equipment due to the fact that each set of paper plies 140,140 is of the same size and both end flap members 142,142 can be closed and sealed by means of a single or similar operation as opposed to requiring two different types of closure operations or techniques to be performed by two different types of equipment.

Thus it may be appreciated that in accordance with the various teachings, disclosures, and principles of the present invention, a new and improved inflatable dunnage bag has been developed whereby not only does such dunnage bag exhibit increased or enhanced burst strength or pressure values, as well as structural integrity against failure by bonding and securing the closed and sealed flap end members by means of unique bonding and adhesive patterns or arrangements thereby effectively preventing the closed and sealed flap end members from becoming unfolded, but in addition, and additionally important and desirable from a manufacturing point of view, the structure of the dunnage bag simplifies its manufacture and permits the manufacture of the dunnage bag to be accomplished by means of automated machinery or equipment. In lieu of the interleaving or interdigitating of the various paper plies of, for example, the second outer composite bag of the completely assembled dunnage bag, wherein such process was extremely tedious, time-consuming, slow, and fatiguing to worker personnel, the dunnage bag of the present invention comprises end flap members which, in effect, comprise units or entities which are adapted to be simply folded and secured or bonded to corresponding complementary portions of the dunnage bag. It is thus to be appreciated that the dunnage bag constructed in accordance with the principles and teachings of the present inventive disclosure constitutes an advancement in the dunnage bag art.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States of America is:

1. An inflatable dunnage bag, comprising:

a first sealed inner bag comprising an air-tight inflatable bladder and a plurality of paper plies fixedly disposed about said inflatable bladder such that said first sealed inner bag, comprising said inflatable bladder and said plurality of paper plies, comprises a composite sealed bag entity;

an outer bag defining first and second sets of paper plies with each one of said first and second sets of paper plies comprising a plurality of paper plies, wherein said first and second sets of paper plies are disposed upon opposite sides of said first sealed inner bag, and wherein further, an outermost paper ply of said plurality of paper plies of a first one of said first and second sets of paper plies has an outer surface so as to define an outermost surface of said first one of said first and second sets of paper plies;

means fixedly mounted and sealed upon said sealed inner bag for inflating said inflatable bladder of said sealed inner bag;

at least one flap member formed at one end of a second one of said first and second sets of paper plies, comprising at least an outermost paper ply of said plurality of paper plies of said second one of said first and second sets of paper plies, and projecting beyond one end of said first one of said first and second sets of paper plies so as to be capable of being folded over said one end of said first one of said first and second sets of paper plies and be secured to said outermost surface of said first one of said first and second sets of paper plies; and means for securing said at least one flap member of said second one of said first and second sets of paper plies to said outermost surface of said first one of said first and second sets of paper plies so as to close and seal said outer bag.

2. The inflatable dunnage bag as set forth in claim 1, wherein:

said plurality of paper plies comprising said first sealed inner bag comprises two paper plies.

3. The inflatable dunnage bag as set forth in claim 1, wherein:

said plurality of paper plies comprising each one of said first and second sets of paper plies of said outer bag comprises six paper plies.

4. The inflatable dunnage bag as set forth in claim 1, wherein:

said at least one flap member comprises a pair of flap members formed upon first ends of said first and second sets of paper plies so as to be capable of being respectively folded over and secured to outermost surfaces of opposite second ends of said second and first sets of paper plies.

5. The inflatable dunnage bag as set forth in claim 1, wherein:

said at least one flap member, formed at said one end of said second one of said first and second sets of paper plies, comprises all of said paper plies of said second one of said first and second sets of paper plies such that said at least one flap member comprises a single, one-piece integral flap unit.

6. The inflatable dunnage bag as set forth in claim 3, wherein:

said at least one flap member, formed at said one end of said second one of said first and second sets of paper plies, comprises all six of said six paper plies of said second one of said first and second sets of paper plies such that said at least one flap member comprises a single, one-piece integral flap unit.

7. The inflatable dunnage bag as set forth in claim 4, wherein:

said first and second sets of paper plies are longitudinally offset with respect to each other so as to form said pair of flap members upon said first ends of said first and second sets of paper plies whereby said pair of flap members respectively project beyond said second ends of said second and first sets of paper plies.

8. The inflatable dunnage bag as set forth in claim 3, further comprising:

bonding means disposed upon each one of said first and second sets of paper plies for securing said plurality of paper plies together.

9. The inflatable dunnage bag as set forth in claim 8, wherein:

said bonding means extends longitudinally with respect to each one of said first and second sets of paper plies.

10. The inflatable dunnage bag as set forth in claim 9, wherein:

said bonding means is disposed only within the vicinity of said at least one flap member.

11. The inflatable dunnage bag as set forth in claim 9, wherein:

said bonding means comprises a plurality of longitudinally extending beads disposed parallel to each other.

12. The inflatable dunnage bag as set forth in claim 8, wherein:

said bonding means is interposed only between predetermined ones of said six paper plies forming each one of said first and second sets of paper plies.

13. The inflatable dunnage bag as set forth in claim 9, wherein:

said bonding means is interposed only between the innermost one of said six paper plies disposed closest to said first sealed inner bag and the next adjacent one of said six paper plies, and between the outermost one of said six paper plies disposed further away from said first sealed inner bag and the next adjacent one of said six paper plies.

14. The inflatable dunnage bag as set forth in claim 13, wherein:

said bonding means comprises cold glue.

15. The inflatable dunnage bag as set forth in claim 1, wherein:

said means for securing said at least one flap member comprises bonding means.

16. The inflatable dunnage bag as set forth in claim 15, wherein:

said bonding means comprises a combination of hot melt adhesive and cold glue beads.

17. The inflatable dunnage bag as set forth in claim 16, wherein:

said hot melt adhesive and said cold glue beads are disposed in a predetermined pattern between said at least one flap member of said second one of said first and second sets of paper plies and said outermost surface of said first one of said first and second sets of paper plies.

18. The inflatable dunnage bag as set forth in claim 17, wherein:

said hot melt adhesive and said cold glue beads are disposed transversely with respect to the longitudinal extents of said first and second sets of paper plies.

19. The inflatable dunnage bag as set forth in claim 1, wherein:

said means for securing said at least one flap member comprises tape means secured to said at least one flap member, formed at said one end of said second one of said first and second sets of paper plies, and to said outermost surface of said first one of said first and second sets of paper plies.

20. The inflatable dunnage bag as set forth in claim 19, further comprising:

bonding means interposed between said tape means and said at least one flap member of said second one of said first and second sets of paper plies, and between said tape means and said outermost surface of said first one of said first and second sets of paper plies.

* * * * *